June 29, 1943.  D. G. C. HARE  2,323,128
METHOD AND APPARATUS FOR DETERMINING LIQUID LEVEL
Filed Sept. 10, 1941
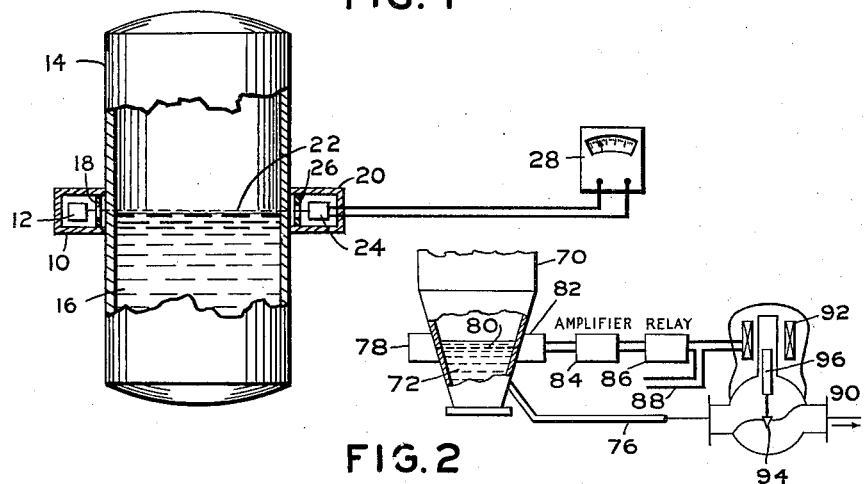
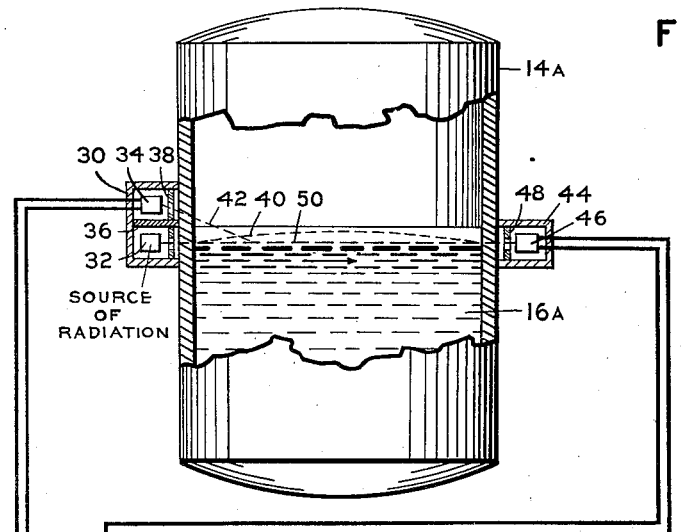
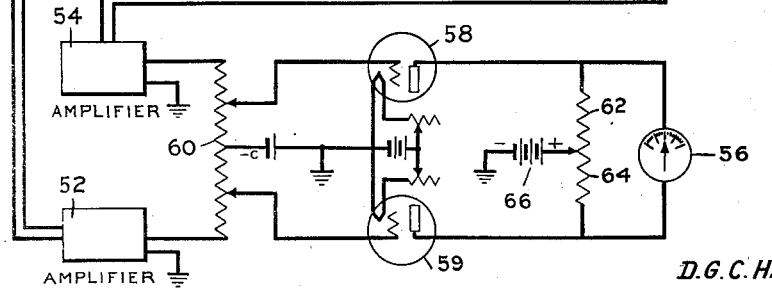
D. G. C. HARE
INVENTOR
BY
HIS ATTORNEYS Patented June 29, 1943

2,323,128

UNITED STATES PATENT OFFICE 2,323,128

METHOD AND APPARATUS FOR DETERMINING LIQUID LEVEL

Donald G. C. Hare, Houston, Tex., assignor, by mesne assignments, to The Texas Company, New York, N. Y., a corporation of Delaware Application September 10, 1941, Serial No. 410,236

8 Claims. (Cl. 250—83.6)

This invention relates to a method and an apparatus for determining and controlling the level of a liquid, and particularly to the determination and control of the level of a liquid such as hydrocarbon oil or tar within a container such as a still. The principal purpose of the invention is to provide such a method and an apparatus which will indicate and accurately control the level of the liquid within the container without the necessity of any direct contact with the liquid or access to the interior of the container.

In processes such as, for instance, the refining or other treatment of hydrocarbon oil it is essential to know and control the level of the liquid within a container such as a still. Various forms of liquid level determining devices have been used but most of these either involve the use of a gauge glass affixed to the container or a float actuated by the liquid and the movement of which is transmitted to some indicating device outside the container through a packing in the container wall. When the liquid within the container is subjected to conditions such as high temperature and high pressure or where the liquid possesses a high viscosity, these devices are frequently not satisfactory. The gauge glasses must be sufficiently thick to withstand the pressures within the container and these devices often become clogged with sediment from the liquid so that they are rendered useless or at least inaccurate. Where a float indicator or controller is used under these conditions, the packing gland in the container wall must be tight enough to withstand the high pressure, and if the gland is made sufficiently tight to prevent leakage, it will usually interfere with the free movement of the float and inaccurate readings and regulation will result. Most electrical devices are not suitable because of the danger that a spark might ignite the inflammable liquid or gas.

In my co-pending application, Serial No. 337,864, filed May 29, 1940, a liquid level indicating method and apparatus are disclosed in which an instrument containing a source of penetrative radiation and a detector or radiation scattered within the container and returned outwardly thereof, is adapted to be placed against and moved vertically along the wall of a container of liquid. The scattering of the radiation which is similar to diffuse reflection, will cause some of the radiation to return to the detector, and the amount of scattering which takes place in a given volume of substance is a function of the density of the scattering material. Thus, when the device is moved, for instance, from a position below the liquid level to a position above the liquid level, the detector will indicate a change in the amount of scattered radiation returned to the detector and the liquid level can thereby be ascertained.

In accordance with the present invention, the principle of absorption of radiation by the material within the container is utilized and a beam of penetrative radiation is directed into and through a portion of the container to a detector associated with an instrument for indicating the amount of radiation transmitted through the container and its contents or, conversely, the amount of radiation absorbed by the contents of the container. Since, with this method we are dealing with a comparatively large amount of substance, there will be a definite and easily detectable change in the amount of radiation transmitted when the apparatus is moved from a position such that the beam of radiation must pass through the liquid, to a position above the liquid where the beam will pass through a gas or vapor.

The intensity of any radiation passing through matter will be diminished by the absorption of the radiation in the matter. This absorption is usually exponential in nature and is usually a very definite function of the density of the matter. Thus, for two substances such as a hydrocarbon liquid and the gas or vapor above such liquid, the denser material will absorb a larger fraction of the radiation passing through a unit length than will the lighter material. On the other hand, it is generally true that a dense fluid will scatter more radiation than will a lighter fluid. Thus, if the radiation is moved from the liquid within the container to a point above the liquid, the scattered radiation detected will decrease while the transmitted radiation will increase. The present invention also includes a method and apparatus by means of which this differential effect is utilized to increase the sensitivity.

For a better understanding of the invention reference may be had to the accompanying drawing in which Fig. 1 is a vertical elevation, partly in section, showing an apparatus utilizing the "transmission or absorption" method; while Fig. 2 is a partially diagrammatic sectional elevation of an apparatus utilizing the "differential" method in which changes in both the scattered and absorbed radiation are determined simultaneously to indicate liquid level.

Fig. 3 is a vertical elevation of an apparatus used for controlling the liquid level.

With reference to the drawing, a housing 10 containing a source 12 of penetrative radiation such as gamma rays or neutrons is adapted to be moved vertically along or near the outer surface of a receptacle, such as a still 14 containing a liquid 16, the liquid level of which it is desired to determine. A collimating system 18 which may be formed by a lead plate is disposed within the housing 10 and contains a small opening through which the radiation is directed into the container. Another housing 20 is adapted to be moved along the outer surface of the container 14, either opposite the housing 10 or at some position such that the beam of radiation 22 will pass substantially horizontally through a portion of the contents of the container to a detector 24 disposed within the housing 20 back of a collimating system 26. An instrument 28 is connected electrically to the detector 24 and provides an indication of the amount of radiation transmitted through the contents of the container to the detector.

In operation, the two devices 10 and 20 are moved substantially simultaneously in a vertical direction along or close to the outer surface of the receptacle 14. When they are at such a position that the radiation 22 will pass through the liquid 16, the instrument 28 will indicate a certain amount of radiation picked up by the detector 24. When the housings have been raised so that the radiation 22 passes above the liquid 16, the instrument 28 will indicate that a considerably larger amount of radiation is being transmitted to the detector 24. In this manner the exact level of the liquid can be quickly determined.

In Fig. 2 apparatus for carrying out the "differential" method is illustrated in connection with a receptacle 14a containing a liquid 16a. A housing 30 containing a source of penetrative radiation 32 and a detector 34 of scattered radiation is adapted to be moved vertically along the wall of the container. The source 32 is separated from the detector 34 by means of a shield, such as a lead plate 36, for preventing direct radiation from the source to the detector. A collimating system 38 is also provided and is formed of shield members containing openings disposed so that radiation 40 from the source 32 will pass into the contents of the container 14a, some of the scattered radiation 42 then returning to the detector 34. The device containing the elements 30 through 38 is substantially the same as that described in my aforementioned co-pending application Serial No. 337,864. As the housing 30 is raised from a point below the level of the liquid 16a to a point above the liquid level, the detector 34 will pick up a decreased amount of scattered radiation due to the fact that the density of the gas or vapor above the liquid is lower than that of the liquid itself.

At a point opposite the housing 30 another housing 44 is adapted to be placed, this housing containing a radiation detector 46 and a collimating device 48, these elements corresponding to the previously described device 24 and 26, shown in Fig. 1. The housing 44 is disposed at substantially the same vertical elevation as the housing 30 and such that some of the radiation 50 from the source 32 will pass through the contents of the container to the detector 46. As the two housings 30 and 44 are moved vertically from an elevation below the liquid level to an elevation above the level of the liquid, there will be an increase in the amount of radiation picked up by the detector 46 due to the fact that there will be less absorption of the radiation in the gas above the liquid than in the liquid itself.

It will be seen from the foregoing description that, as the two devices or housings 30 and 44 are moved vertically from a point below the liquid level to a point above the liquid level, there will be a decrease in the amount of scattered radiation picked up by the detector 34 and a simultaneous increase in the amount of transmitted radiation picked up by the detector 46. This differential effect is utilized to cause an indicating instrument to show a greater response than could be shown if only the scattering method or the transmission or absorption method alone were used.

The detector 34 is connected electrically to a device 52 which may be an amplifier or other device whose function is to make the response of the detector suitable for utilization in the circuit shown. The detector 46 is connected electrically to a similar amplifier 54, and the amplifiers are connected to a vacuum tube circuit of the two-tube, push-pull amplifier type in which a meter 56 is connected to the plates of the tubes 58 and 59. The output circuits of the amplifiers 52 and 54 include a potentiometer 60 and a pair of load resistors 62 and 64 are connected between the anodes of the tubes 58 and 59 and a source of positive potential 66. As long as the plate of the tube 58 has the same potential as the plate of tube 59, the meter 56 will read zero. By varying the ratio of resistances 62 and 64, this condition can always be obtained as long as the inputs to the grids of tubes 58 and 59 are kept within certain reasonable limits. Since there must be a difference in potential between the plates of tubes 58 and 59 if the meter is to indicate a flow of current, changing the potential on the grids of both of tubes 58 and 59 by the same amount will cause no change in the meter reading. If, however, the potential of the grid of tube 58 is changed relative to the grid of tube 59, the plates of these tubes will be at different relative potentials than before and this change may be indicated by the meter 56. When these grid potentials are changed in opposite directions, as by the output of detector 34 increasing while that of detector 46 decreases, there will be a relatively large change in the reading of the meter 56.

There are several advantages to this differential method. For instance, fluctuations in the intensity of the source of radiation used will, to a high approximation, have no effect on the reading of the meter, since both detectors 34 and 46 will be affected equally and in the same direction. Similarly, fluctuation in the various voltage supplies necessary for the operation of such an instrument could be made negligible.

Although the invention has been described thus far primarily as a method of and an apparatus for measuring liquid level, the principles involved can also be used in a system for controlling the liquid level in a container. In Fig. 3 an arrangement is shown for accomplishing this result. A vessel or other container 70 which may, for instance, be an oil still in the lower portion of which tar 72 accumulates, is provided with an outlet or tar draw-off line 76. A device 78 containing a source of penetrative radiation similar to the elements 10, 12 and 18 of Fig. 1 is secured to the exterior of the still 70 in such a manner that a beam of radiation 80 will pass through the still to a detecting device 82 which may correspond to the elements 20, 24 and 26 of Fig. 1.

The source and detector are mounted at a height corresponding to the desired level of the tar 72. The device 82 is secured to the outside of the still in the path of the radiation 80 and is connected electrically with a suitable amplifier 84, the output of which passes to a relay 86 which may be of the galvanometer type in which an electric contact is made or broken on a predetermined output of the amplifier. The galvanometer relay 86 is connected in series with a source of electrical supply indicated at 88 and a valve actuating device indicated generally at 90 which may be of the solenoid type. The device 90 includes a magnet winding or coil 92 and a valve 94 secured to a movable core or armature 96. The valve is shown as located in the tar draw-off line 76.

In operation, assuming that the liquid or tar level 100 is above the path of the radiation 80, most of the radiation from the source 78 will be absorbed in the liquid 72 so that the response of the detector 82 or, rather, the response of the amplifier 84 will be insufficient to actuate the relay 86 to close the circuit through the solenoid coil 92. The valve 94 will, therefore, remain closed and no fluid will pass through the pipe 76. When the tar level 100 rises above the path of the radiation 80 a smaller amount of radiation will be transmitted to the detector 82 and the decrease in current from the amplifier 84 will cause the relay 86 to close the circuit including the source of supply 88 and the coil 92, whereupon the armature 96 will be drawn up into the coil to open the valve 94, thus allowing tar to pass from the still. When the level 100 has again reached a point at or slightly below the radiation path 80, the relay 86 will open the circuit allowing the valve 94 to close.

Although the valve device 90 is shown as connected in a tar draw-off line, this device could obviously be located in an inlet to a still or other vessel. Although a solenoid operated valve has been disclosed, other suitable apparatus responsive to variations in the amount of radiation transmitted to the detector 82 could be used for controlling a flow of fluid. The valve 94 could also be located in a fuel supply line to a heater used in connection with a vessel 70, so as to control the amount of heat applied to the liquid in the vessel, in accordance with the level of the liquid therein.

Instead of relying only on variations in radiation transmitted through the still or vessel, the apparatus of Fig. 2 could likewise be used by substituting the devices 30 and 44 for the source 78 and detector 82, respectively, of Fig. 3 and the amplifier 84 then connected in the electrical circuit in place of the meter 56 of Fig. 2. In this manner a larger current will pass to the amplifier due to the simultaneous but inverse response of the detectors 34 and 36 of scattered and transmitted radiation.

Obviously many other modifications and variations of the invention, as hereinbefore set forth, may be made without departing from the spirit and scope thereof and, therefore, only such limitations should be imposed as are indicated in the appended claims.

I claim:

1. A method of determining the level of a liquid in a closed container which comprises directing through the wall of said container penetrative radiation emitted from a source, detecting radiation which is scattered by means of the material within the container, simultaneously detecting radiation which is transmitted through the container to its opposite side and moving the source and detecting means vertically along the container until a point is reached at which a sudden variation in the amount of scattered radiation and a sudden variation in the amount of transmitted radiation is indicated by the detecting means.

2. A method of determining the level of a liquid in a closed container which comprises directing through said container from one side to the other side a beam of neutron radiation emitted from a source, detecting neutrons which are scattered by means of the material within the container, simultaneously detecting neutrons which are transmitted substantially straight through the container, and moving the source and the detecting means vertically along the container until a point is reached at which a sudden increase or decrease in the number of scattered neutrons and a sudden decrease or increase respectively in the number of transmitted neutrons, is indicated by the detecting means.

3. A device for determining the level of a liquid in a container having opaque walls which comprises a housing, a source of penetrative radiation in said housing, said housing adapted to be held against the outer surface of the side wall of said container, a second housing adapted to be held against the outer surface of said container away from said source, a device in said second container for detecting radiation transmitted through said container and an instrument connected to said detecting device for indicating a variation in the amount of transmitted radiation as said housings are moved vertically along the outer opposite walls of said container.

4. A device for determining the level of a liquid in a container which comprises a housing, a source of penetrative radiation in said housing, said housing adapted to be held against the outer surface of the side wall of said container, a device in said housing for detecting radiation emitted by said source and scattered in the material within said container, a second housing adapted to be held against the outer surface of said container opposite said source, a device in said second housing for detecting radiation transmitted through said container and an instrument connected to said first and said second detecting means for indicating variations in the amount of transmitted and scattered radiation as said housings are moved vertically along said container.

5. The method of determining variations in the level of a liquid in a closed container which comprises directing through the wall of the container penetrative radiation emitted from a source disposed outside the container at a height corresponding to the desired height of the liquid level in the container, simultaneously detecting radiation transmitted substantially horizontally through the container and radiation scattered by means of the material in the container and noting any sudden variations in the amount of transmitted and scattered radiation caused by movement of the liquid level to points above or below the path of said radiation.

6. A method of controlling the liquid level in a container provided with an inlet or discharge conduit which comprises directing through the wall of said container at the desired height of said liquid level penetrative radiation emitted from a source, detecting radiation which is scattered by means of the material within the container, simultaneously detecting radiation which is transmitted through the container to its opposite side and controlling the amount of fluid passing through said conduit in accordance with variations in the amount of scattered and transmitted radiation detected, said variations being caused by fluctuations in the liquid level in the container.

7. The method of controlling the level of the tar accumulating in a hydrocarbon oil still provided with a tar draw-off conduit which comprises disposing a source of gamma radiation so that a beam of said radiation will enter said still from one side thereof, disposing a detector of scattered radiation near said source and disposing a detector of transmitted radiation in the path of said beam at another side of said still so that the response of said detectors will vary in accordance with variations in the liquid level within the still, and controlling the flow of tar through said draw-off conduit in accordance with variations in the amount of transmitted and scattered radiation picked up by said detectors, said variations being caused by fluctuations in the level of the tar.

8. A device for controlling the level of a liquid in a container provided with an inlet or outlet conduit which comprises a housing, a source of penetrative radiation in said housing, said housing adapted to be held against the outer surface of the side wall of said container, a second housing adapted to be held against the outer surface of said container away from said source, a device in said second housing for detecting radiation transmitted through said container, a device in the first-mentioned housing for detecting radiation scattered in the liquid within the container, a valve in said conduit and means responsive to the output of said detectors for actuating said valve to control the amount of fluid passing through said conduit.

DONALD G. C. HARE.